March 25, 1947.   H. T. AUSTIN   2,418,064
WHEEL REVOLVING MEANS
Filed Sept. 29, 1942

HAROLD T. AUSTIN
INVENTOR

BY *Smith + Tuck*
ATTORNEYS

Patented Mar. 25, 1947

2,418,064

UNITED STATES PATENT OFFICE 2,418,064

WHEEL REVOLVING MEANS

Harold T. Austin, Seattle, Wash.

Application September 29, 1942, Serial No. 460,136

5 Claims. (Cl. 244—103)

1

The present invention relates to wheel revolving means for airplanes, and in more particular to attachments for airplane tires which will rotate a tire in the proper direction when a landing is contemplated.

Very little of the distance traveled by a land based airplane is on the ground, and yet the tires of planes rapidly wear out. The wear on these tires is had largely at the time of initial contact between the tire and the ground when a speeding plane lights on the ground.

When a plane has been in the air for a short time, the wheels are either not rotating or rotating very slowly in a forward direction, or they may be rotating rapidly in a rearward direction. The reverse rotation is oftentimes due to a faster slip stream nearer the plane than farther away; this caused by the propeller wash.

If a wheel can be rotated at a speed approximating the ground speed, the tires will last the life of the plane, and that with lighter weight tires. This is an important saving.

The prior art attempts to solve this problem by positively driving the wheels with a power take-off from the engine, and results in a heavy and cumbersome arrangement unsatisfactory from many standpoints, or by the use of outstanding vanes on the tires or wheels, which vanes would be driven by the air stream.

In the past, the use of vanes has not been satisfactory because of the difficulty of getting them to operate to turn the wheel in the right direction. This has been particularly true of those having a fixed stream line.

Other vanes have been used which were designed to feather, but the weight of mechanical parts and the wear on them has been excessive. Also, many of the vanes were mounted in a manner to be affected in their action by centrifugal forces set up by the wheel's rotation.

Having in mind these defects of the prior art, it is an object of the present invention to construct a light weight and simple device for rotating airplane wheels.

A further object of the present invention is the provision of a feathering vane for driving airplane wheels.

Another object of the present invention is the provision integral with an airplane tire of feathering vanes for driving the tire and wheel.

A still further object of the present invention is to provide an airplane tire with revolving means operable when the tire is disposed in the air currents incident to flight of an airplane.

2

The foregoing objects and others ancillary thereto, I prefer to accomplish as follows:

Knowing these defects of the prior art, and having in mind the above objects, I have provided, in a preferred embodiment of my invention, a tire with resilient flaps, or vanes, along and on the side walls of the tire. These flaps are designed to lie normally flat against the tire ide wall, to be secured along one flap edge radially of the tire and to be free along the opposite radial flap edge. Usually the outer and inner circumferential edges are also secured to the side wall. This leaves one edge of the flap free and orms with a tire a small pocket between the side wall and the flap. These pockets or vanes, are arranged sequentially around the side wall of the tire, or it may be said that these pockets, or vanes, are arranged circumferentially of the tire on the side walls. When the tire is placed in a tream of air, the air will blow against the secured radial, or back, edge of one half of the vanes to make the pocket stay closed, and will blow against the free radial edge of the other half to distend and open their pockets. The open pockets will afford more resistance to the air tream than the closed pockets, and thus cause he tire and its wheel to rotate in a direction such that the open pockets follow the air stream.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawing, in which Figure 1 is an elevational view of a wheel and tire embodying the present invention;

Figure 1:
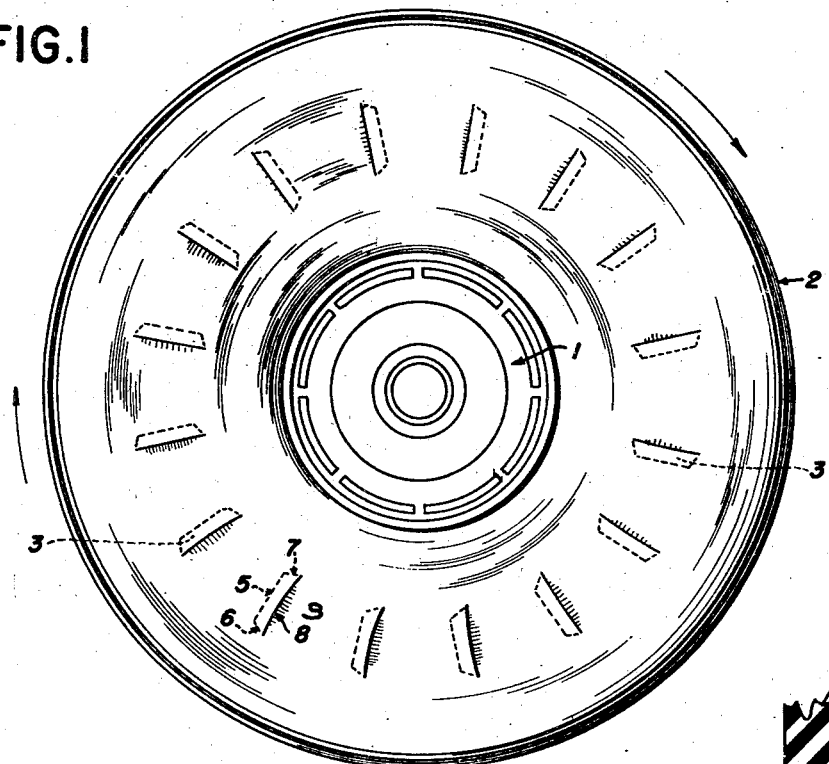

In Figure 1 there is shown a wheel 1 carrying a tire 2. The side walls of the tire have formed therein a series of pockets 3. These pockets are formed of a small sheet of rubber 4, integral with the tire along the edges 5, 6, 7 of the sheet except along one radial edge 8, this edge forming part of the open side of the pocket. The rubber sheet 4 is in effect a vane that is biased in one direction more than the other so that in its normal relaxed position the pocket is urged to the closed position of Figure 3. All of the pockets are identical and similarly placed radially and circumferentially of the tire in a sequence.

When the tire is placed on a wheel and the wheel mounted on an airplane, the tire should be in position so that the air stream passing from the front to the rear of the plane will open the pockets in the lower portion of the tire.

The stiffness of the rubber sheets 4 and their attachment to the tire is such that they will open in the air stream.

The pockets on the top portion of the tire will remain closed until they reach the lower position upon rotation, and those in the lower portion will then be closed as they rotate upwardly. This means that as the tire rotates the pockets will open and close sequentially to form vanes that are acted upon by the air stream to drive the tire.

The location of the vanes or pockets on the side of the tire instead of on the rim means that they are not urged to an open position by the centrifugal forces acting upon them. It also means that the linear speed of the rim will be greater than that of the vanes, and this difference will compensate for the slippage of the vanes and allow the linear speed of the rim to approach that of the air speed. This, with the fact that a plane usually lands into the wind, means that the linear speed of the tire may be brought up to the ground speed so that upon landing there will be little or no abrasive action between the tire and the ground.

Figure 3:
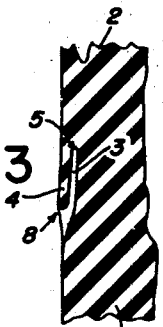
Figure 3 is a fragmentary sectional view on the line 3—3 of Figure 2, showing the vane in closed position.
Figure 2:
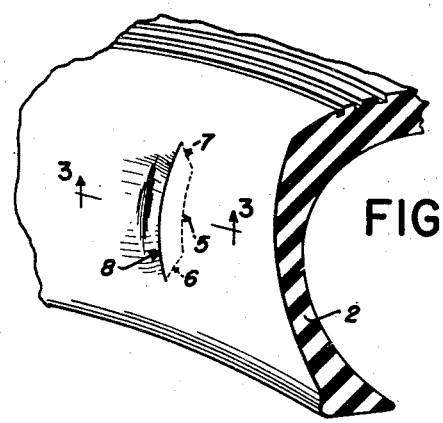
Figure 2 is a perspective view, partially in section, of the tire of Figure 1, showing the invention in greater detail.
Figure 4:
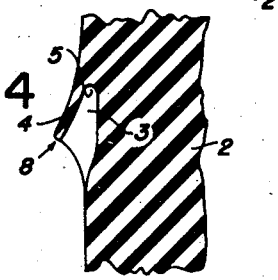
Figure 4 is a view similar to Figure 3, but showing the vane in open position.
Figure 5:
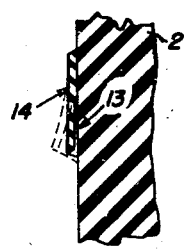
Figure 5 is a view similar to Figure 3, but showing a modified form of the vane.

Figure 3 shows the pocket being formed in a recess in the tire, while Figure 5 shows the pocket 13 formed outside of the normal surface of the tire by the securing of the rubber sheet 14 over that surface.

The inner and outer radial edges of the rubber pieces 4 and 14 are secured to the tire wall to obtain a bias which normally holds the pocket closed. This bias may be secured by fastening the piece along only the back edge. The pockets may also be formed by attaching the vanes to the wheel by any suitable means, the operating being the same in either modification.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. An airplane tire, comprising: a carcass having a plurality of depressions formed in a side wall and arranged circumferentially thereof, an elastic vane non-extensively secured to said tire about a uniform portion of the rim of each said depression, an unsecured edge portion of each vane spanning the adjacent depression to expose a portion thereof, said vanes and the tire wall portion forming the bottom of the depressions constituting unidirectional pockets expansible when the unsecured vane edge is directed at wind.

2. An airplane tire, comprising: a carcass having a plurality of depressions formed in a side wall in a circumferential series, an elastic vane secured to said tire about a uniform portion of the rim of each depression, each said vane having an unsecured edge and normally being unstretched, said vanes and the side wall portion forming the bottom the depressions constituting unidirectional pockets expansible when the unsecured vane edge is directed at wind.

3. An airplane tire, comprising: a carcass having elastic vanes non-extensibly secured to the side wall about a portion of the edge of each vane, said vanes being arranged circumferentially of the side wall and having their unsecured edge portions uniformly directed radial of the carcass axis, said vanes normally being substantially flush with the contour of the tire side wall and forming with the underlying side wall portions unidirectional pockets expansible when the unsecured vane edge is directed at wind.

4. An airplane tire, comprising: a carcass having elastic members non-extensibly secured to the side wall in circumferential arrangement to form a series of pockets thereon, each said pocket having a slit opening near an edge, said slit openings being radial of the carcass axis and uniformly arranged, each said pockets being expansible when the slit opening side thereof is directed at wind.

5. An airplane tire, comprising: a carcass having elastic members non-extensibly secured to a side wall in circumferential arrangement to form a series of pockets thereon, each said member normally having its outer face flush with the face of the carcass side wall, each said pocket having a slit opening near an edge of the pocket, said slit openings being radial of the carcass axis and uniformly arranged, each said pockets being expansible when the slit opening side thereof is directed at wind.

HAROLD T. AUSTIN.

REFERENCES CITED

The following references are of record in the file of this patent:

UNITED STATES PATENTS

| Number | Name | Date |
| --- | --- | --- |
| 1,522,448 | Harig | Jan. 6, 1925 |
| 2,305,237 | Carpenter | Dec. 15, 1942 |
| 2,333,447 | Schippel | Nov. 2, 1943 |
| 2,312,159 | Gulotta | Feb. 23, 1943 |

FOREIGN PATENTS

| Number | Country | Date |
| --- | --- | --- |
| 516,738 | British | Jan. 10, 1940 |